(12) United States Patent
Sudhakar et al.

(10) Patent No.: US 7,836,278 B2
(45) Date of Patent: Nov. 16, 2010

(54) THREE OPERAND INSTRUCTION EXTENSION FOR X86 ARCHITECTURE

(75) Inventors: Ranganathan Sudhakar, Santa Clara, CA (US); Michael Frank, Sunnyvale, CA (US); Debjit Dassarma, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 398 days.

(21) Appl. No.: 11/954,623

(22) Filed: Dec. 12, 2007

(65) Prior Publication Data

US 2009/0031116 A1    Jan. 29, 2009

Related U.S. Application Data

(60) Provisional application No. 60/951,898, filed on Jul. 25, 2007.

(51) Int. Cl.
G06F 9/30 (2006.01)
(52) U.S. Cl. .................................... 712/209; 712/210
(58) Field of Classification Search ................ None
See application file for complete search history.

(56) References Cited

U.S. PATENT DOCUMENTS

| 6,049,863 A | 4/2000 | Tran et al. | |
|---|---|---|---|
| 6,141,745 A | 10/2000 | Pickett | |
| 6,157,996 A * | 12/2000 | Christie et al. | 712/218 |
| 6,275,927 B2 | 8/2001 | Roberts | |
| 6,571,330 B1 | 5/2003 | McGrath et al. | |
| 6,625,724 B1 * | 9/2003 | Kahn et al. | 712/229 |
| 6,981,132 B2 | 12/2005 | Christie et al. | |
| 7,302,551 B2 * | 11/2007 | Henry et al. | 712/203 |
| 2004/0268090 A1 | 12/2004 | Coke et al. | |

OTHER PUBLICATIONS

U.S. Appl. No. 11/944,870; filed Dec. 30, 2004.

* cited by examiner

*Primary Examiner*—Eric Coleman
(74) *Attorney, Agent, or Firm*—Rory D. Rankin; Meyertons, Hood, Kivlin, Kowert & Goetzel, P.C.

(57) ABSTRACT

A method and apparatus are contemplated for increasing the number of available instructions in an instruction set architecture. The new instructions extend the number of general-purpose registers and include three or more operands. A combination of an escape code field, an opcode field, an operation configuration field and an operation size field determines a unique new instruction operation. A source operand extension field includes bits to be combined with other fields in order to extend the number of source operand values for general-purpose registers.

17 Claims, 5 Drawing Sheets

← Byte Format 400

| Opcode 410 | OC1 412 | OPS 414 |

*FIG. 4A*

| Destination 420 | OC0 422 | R 424 | X 426 | B 428 |

*FIG. 4B*

THREE OPERAND INSTRUCTION EXTENSION FOR X86 ARCHITECTURE

This application claims benefit of priority of U.S. Provisional Patent Application No. 60/951,898, entitled "Three Operand Instruction Extension For X86 Architecture" and filed on Jul. 25, 2007.

BACKGROUND OF THE INVENTION

1. Field of the Invention

This invention relates to computing systems, and more particularly, to increasing the number of available instructions in an instruction set architecture wherein a new instruction includes an extra operand.

2. Description of the Relevant Art

Advances in computer architecture, semiconductor technology, and algorithm development have increased the complexity of microprocessor design while improving performance. Some instruction set architectures (ISAs) are reaching a limit in performance growth in an attempt to allow algorithm development to continue to advance. There are a few options for further increasing microprocessor performance. One option is to reduce the time required to execute individual instructions. However, clock periods are reaching a minimum limit due to semiconductor technology. A second option is to execute more instructions in parallel, but this option is expensive and increases the bandwidth pressure on the register file and bypass network. A third option is to increase the amount of work done by an instruction. Performing more work per instruction can be done in multiple ways and generally requires that more data per instruction is delivered to the execution units.

The third option has created demands to extend existing processor ISAs to support new algorithms by implementing new instructions. However, some ISAs have no method to identify more than 2 arithmetic operands in an instruction. There have been several attempts to solve this issue. For example, one method is fusing two separate micro instructions where each instruction identifies part of the required operands. Another method includes inferring additional operands based on the supplied operands. If register A is used as the first source operand, then the second operand may be assumed to come from register A+1. These methods still do not allow many arithmetic instructions to identify three operands and allow algorithms to continue to advance.

In view of the above, an efficient method for increasing the number of available instructions in an ISA wherein a new instruction includes an extra operand is desired.

SUMMARY OF THE INVENTION

A method and apparatus are contemplated for increasing the number of available instructions in an instruction set architecture. The new instructions extend the number of general-purpose registers and include three or more operands. In one embodiment, a decoder in a microprocessor receives an instruction from an instruction fetch unit and detects an escape code field within the instruction. The combinatorial logic for this detection may already exist, since the escape code field uses pre-existing encodings. Additional logic detects a combination of the escape code field, an opcode field, an operation configuration field and an operation size field to determine a unique new instruction operation. These fields have one of a plurality of predetermined values. The decoder is further configured to detect a source operand extension field that includes bits to be combined with other fields in order to extend the number of source operand values for general-purpose registers. The decoder converts one or more fields of the instruction into control signals. The decoder later conveys the control signals and one or more fields to a scheduler for instruction issue to an execution unit. In the execution unit the unique operation of a new instruction is performed according to the control signals.

In another embodiment, a method is contemplated for increasing the number of available instructions in an instruction set architecture, wherein the new instructions extend the number of general-purpose registers and include three or more operands. The method detects a combination of an escape code field, an opcode field, an operation configuration field and an operation size field to determine a unique new instruction operation. Also the method includes a source operand extension field in the new instruction format that includes bits to be combined with other fields. This combination of bits extends the number of source operand values for general-purpose registers.

These and other embodiments, variations, and modifications will become apparent upon consideration of the following description and associated drawings.

BRIEF DESCRIPTION OF THE DRAWINGS

FIG. 4A is a generalized block diagram illustrating one embodiment according to the invention of the third byte, Opcode3, of a new instruction.

FIG. 4B is a generalized block diagram illustrating one embodiment according to the invention of the DREX byte of a new instruction.

Figure 1:
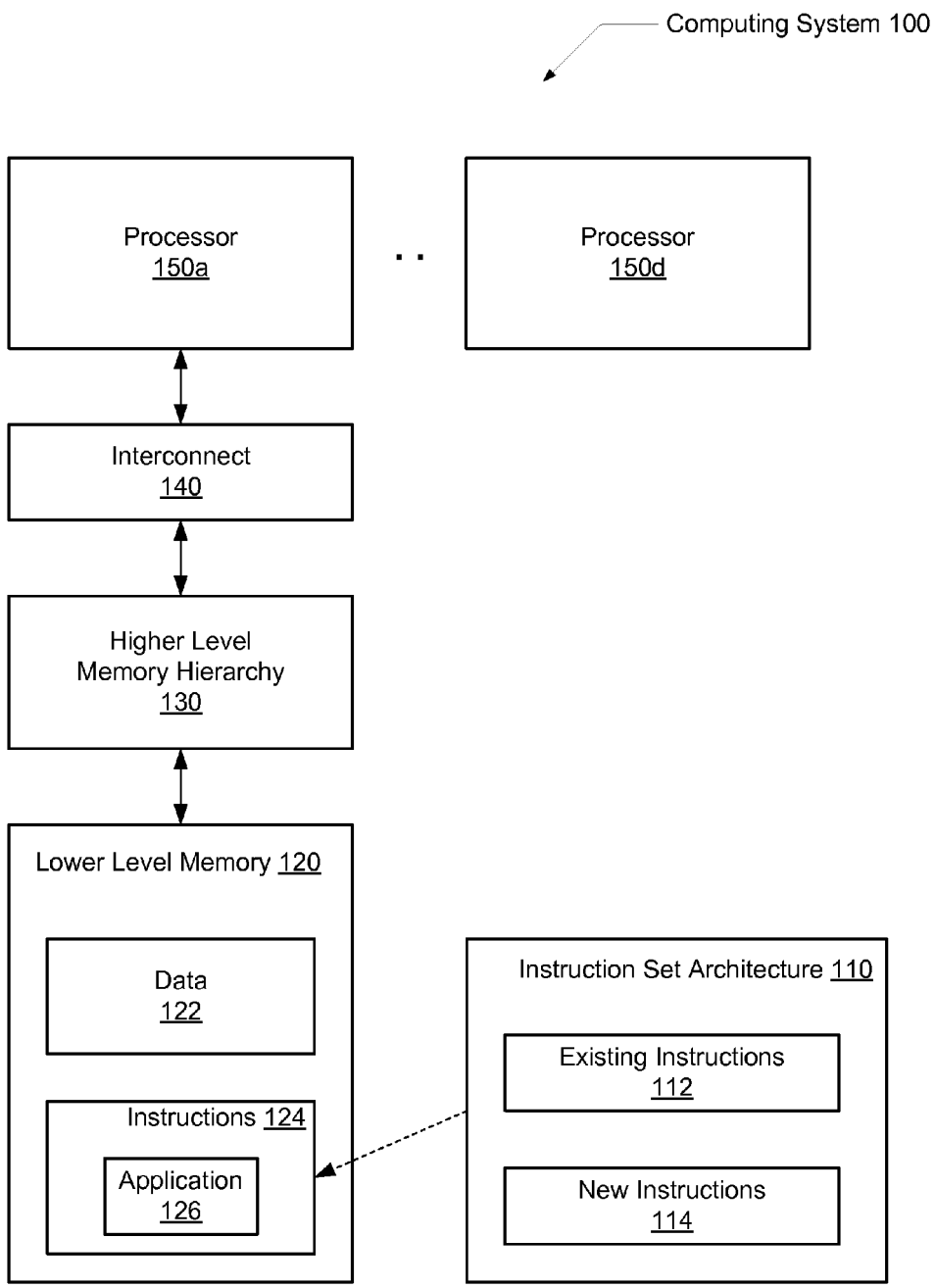
FIG. 1 is a generalized block diagram illustrating one embodiment of a computing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Referring to FIG. 1, one embodiment of a computing system 100 is shown. An instruction set architecture (ISA) 110 may include instructions for MIPS, x86, x86-64, SPARC, PA-RISC, or other architecture. The ISA 110 may include existing instructions 112 and new instructions 114. The new instructions 114 may include an encoding to expand the number of instructions in the ISA without changing the decode of the existing instructions 112. In one embodiment, the new instructions 114 may include 128-bit media instructions for the x86 ISA. Both instructions 112 and 114 may vary in length from one another. The new instructions 114 may have a format that allows the expansion of the number of general purpose registers (GPRs) used to execute the instructions. Both instructions 112 and 114 may be used to form a software application 126 to perform useful work.

The software application 126 may be stored with other applications in a lower level memory 120. In one embodiment, lower level memory 120 may comprise a hard disk. Memory 120 may store instructions 124 which comprise applications 126. Also, memory 120 may store data 122 used during the execution of applications 126. The memory system of computing system 100 may comprise a hierarchy with faster and smaller memory such as caches at the top of the hierarch and slower and larger memory such as a hard disk at the bottom of the hierarchy. In one embodiment, higher level memory hierarchy 130 may comprise multiple levels of caches, dynamic random access memory (DRAM), dual in-line memory modules (dimms), or other to store copies or updated values of both data 122 and instructions 124.

Interconnect 140 may comprise memory controllers and interfaces to the memory controllers, to hierarchy 130, and to a network that may connect computing system 100 to other computing systems. Interconnect 140 may include buses and control protocols to implement the interfaces. Processor 150a may comprise a processor core and one or more levels of caches. As used herein, elements referred to by a reference numeral followed by a letter may be collectively referred to by the numeral alone. For example, processors 150a-150d may be collectively referred to as processors 150. As shown, each processor 150 may be coupled to interconnect 140. In one embodiment, each processor 150 may comprise one or more levels of caches or each processor may only have off-chip memory storage in hierarchy 130. In alternative embodiments, each processor 150 may comprise multiple processor cores. Each core may include a superscalar microarchitecture with a multi-stage pipeline.

Figure 2:
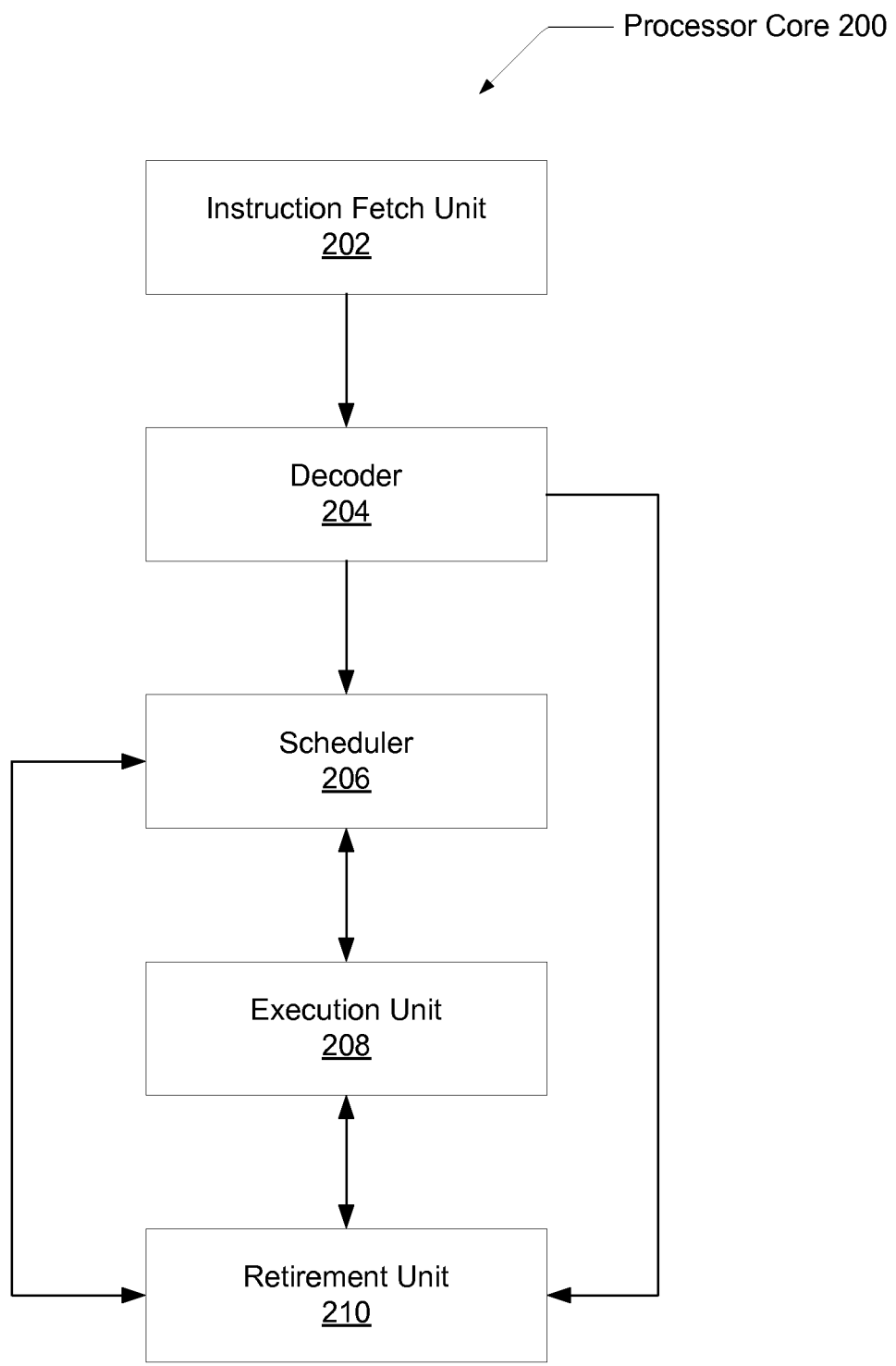
FIG. 2 is a generalized block diagram illustrating one embodiment of a pipelined out-of-order executing processor.

FIG. 2 illustrates one embodiment of a processor core 200 that performs pipelined out-of-order execution. An instruction fetch unit (IFU) 202 fetches instructions from memory which may include a first-level instruction-cache (i-cache) and a corresponding instruction translation-lookaside-buffer (i-TLB). The instruction i-cache and i-TLB may store instructions and addresses respectively in order to access the instructions for a software application. In one embodiment, the IFU 202 may fetch multiple instructions from the i-cache per clock cycle if there are no i-cache or i-TLB misses. The IFU 202 may include a program counter that holds a pointer to an address of a memory line containing the next instruction(s) to fetch from the i-cache. This address may be compared to addresses in the i-TLB. The IFU 202 may also include a branch prediction unit to predict an outcome of a conditional instruction prior to an execution unit determining the actual outcome in a later pipeline stage. Logic to calculate a branch target address may also be included in the IFU 202.

The decoder unit, or decoder, 204 decodes the opcodes of the one or more fetched instructions per clock cycle. The instructions arrive from the IFU 202. After decoding, both data and control signals for the instruction may be sent to a scheduler 206 for instruction issue to a function unit in the execution unit 208. In one embodiment, the instructions may be pre-decoded prior to arriving in the decoder 204. The instructions may be stored in the i-cache in the pre-decoded format or the instructions may be pre-decoded in the IFU 202. The decoder 204 may decode currently existing instructions of an instruction set architecture such as an x86 microarchitecture or other microarchitecture and new instruction formats such as the format of the invention. These instructions may include flow control operations such as conditional branch or jump operations, memory access operations such as load and store operations, data movement operations such as a register-to-register move, data rotate on a byte-by-byte basis, set and reset of data fields, or other; and arithmetic operations. The arithmetic operations may be performed in various formats, which may include single-precision, double-precision, extended floating point, and signed and unsigned integer formats. It is apparent to one skilled in the art that the above instruction types and formats are not all inclusive.

The decoder 204 may be capable of decoding instructions of a format defined by the invention. The decoder 204 may detect a 2-byte escape code and accordingly decode a third byte in order to determine the operation, operand configuration, and operand size. Other bytes within the instruction format are used to determine the source and destination operands and numeric format. The decoder 204 may allocate entries in an in-order retirement queue, such as a reorder buffer within the retirement unit 210, in reservation stations within the scheduler 206, and in a load/store unit within the execution unit 208. The allocation of entries in the reservation stations is considered dispatch.

The scheduler 206 may include circuitry to store decoded instructions and send them out-of-order to the execution unit 208 when the source operands are available. The scheduler 206 may contain queues, or buffers, known as reservation stations where instructions wait until their operands become available. When both operands and hardware resources within the execution unit 208 are available, an instruction may be issued out-of-order from the reservation stations. These instructions may be issued to integer and floating-point arithmetic functional units, a load/store unit, or other within the execution unit 208. The functional units may include arithmetic logic units (ALU's) for computational calculations such as addition, subtraction, multiplication, division, and square root. Logic may be included to determine an outcome of a flow control conditional instruction. The load/store unit may include queues and logic to execute a memory access instruction. Additional circuitry may be included to perform the operations of the new instructions 114.

Results from the functional units and the load/store unit within the execution unit 208 may be presented on a common data bus in order to retire instructions and to bypass data to dependent instructions. The results may be sent to a reorder buffer. In one embodiment, the reorder buffer may be implemented as a first-in first-out (FIFO) queue that ensures in-order retirement of instructions according to program order. Here, an instruction that receives its results is marked for retirement. If the instruction is head-of-the-queue, it may have its results sent to a register file. The register file may hold the architectural state of the general-purpose registers (GPRs) of the processor core. The number of accessible GPRs may increase due to the format of the new instructions 114.

Figure 3:
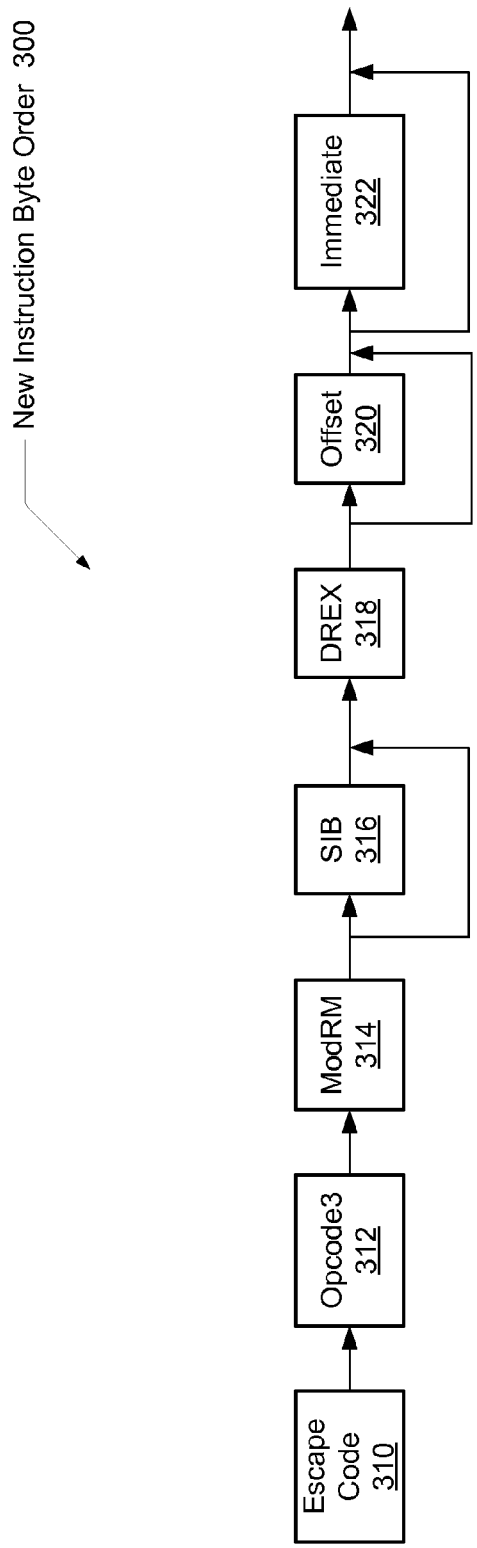
FIG. 3 is a generalized block diagram illustrating one embodiment according to the invention of an instruction byte order.

Referring to FIG. 3, a block diagram of one embodiment of a new instruction byte order 300 according to the invention is shown. For purposes of discussion, the fields are shown in a particular order and will be discussed in units of bytes, or a grouping of 8 bits. However, in various embodiments, the fields may be arranged in any order, may not be contiguous, and the fields may have varying sizes that are not in units of bytes. As shown, an instruction includes an escape code 310 that may have a size of two bytes. The escape code 310 may be used to define a new instruction. The escape code 310 may use values that already exist in decode logic in order to not greatly increase the complexity of the circuitry used to decode existing instructions. In one embodiment, the escape code 310 may use the values 0x0F24 and 0x0F25 to denote the use of new instructions. As used herein, the notation 0x indicates the subsequent number is in hexadecimal format. The detection of the escape code 310 by decode logic notifies the logic to inspect the Opcode3 field 312.

The Opcode3 field 312 may include bits to combine with the escape code 310 to define a new instruction. Also, Opcode3 field 312 may include bits to define the operand configuration within the instruction and the operand size and format. The ModRM field 314 may specify registers and addressing modes to be used by the instruction. Any addressing mode may be used to specify the source operands and the destination field. The ModRM 314 field may include information to specify that information within the Scale-Index-Base (SIB) field 316 may be needed to define the addressing format. Similarly, the offset 320 and immediate 322 fields may be used to determine a source operand in certain addressing formats.

The destination and register extension (DREX) field 318 may be used to define the destination register of the operation. Also, bits within the DREX field 318 may be appended to bits within the ModRM field 314 in order to extend the number of registers to use as source operands.

FIG. 4A illustrates one embodiment of a byte format of the Opcode field 312. As stated above, the fields are shown in a particular order and will be discussed in units of bits. However, in various embodiments, the fields may be arranged in any order, may not be contiguous, and the fields may have varying sizes that are not in units of bits. As shown, Opcode3 field 312 includes an Opcode field 410. Opcode field 410 may include information to append to the escape code field 310 in order to define a new instruction. Opcode field 410 may comprise 5 bits.

The operand configuration (OC1) field 412 may include information to define the order of the operands in the new instruction format. The OC1 field 412 may comprise 1 bit. For example, if the OC1 field 412 has a value of 1, then the destination register is defined by the DREX field 318, the first source operand is a register value defined by the ModRM field 314, and the second source operand is either a register value or a memory location also defined by the ModRM field 314. Alternatively, if the OC1 field 412 has a value of 0, then the previous first and second source operand definitions are reversed.

The operation size (OPS) field 414 may include information to define the size and format of the operation. In one embodiment, OPS field 414 may comprise 2 bits. For example, in one embodiment, if the combination of the escape code 310 and Opcode3 312 fields define an integer operation, then the OPS field 414 may define whether the operation is to operate on a byte, word, doubleword, or quadword format size. In another embodiment, if the operation is found to be a floating-point operation, then the OPS field 414 may define whether to operate on a packed single-precision, packed double-precision, scalar single-precision, or scalar double-precision format size. Other combinations are possible and may be defined in the above described fields.

In one embodiment, an example of an instruction with a combination of an escape code field 310 and Opcode3 field 312 may have the value 0x0F2440 for the combination. This combination may specify an operation that rotates each byte in a first source operand by the amount specified in the signed value of a second source operand and writes the result in a corresponding byte of the destination field. However, a combined value of 0x0F2444 may be the same operation but with a word boundary rather than a byte boundary.

FIG. 4B illustrates one embodiment of a byte format of the DREX field 318. The destination field 420 may define the destination register of the operation. Field 420 may comprise 4 bits, and, thus, allow an extension of the number of GPRs to use. For example, for 64-bit multimedia instructions, the 4-bit destination field 420 may allow the operation to use registers XMM8-XMM15 where an XMM register is a floating-point single-instruction-multiple-data (SIMD) multimedia register.

The operand configuration (OC0) field 422 may include information to define the order of the operands when the new instruction format includes the destination register as one of the source operands. In this case, the contents of the destination register will be used in the execution of the operation and the value will be overwritten by the operation results. The OC0 field 422 may comprise 1 bit and may be combined with the OC1 bit to define the operand configuration. For example, in one embodiment, an operation with three source operands may have the order of the source operands change between the destination register, a XMM register value, or a memory location depending on the values of the OC1 field 412 and the OC0 field 422.

The R field 424 may comprise 1 bit and when set it may extend a value stored in the ModRM field 314 that specifies, for example, an XMM register to be used as a source operand. In one embodiment, this extension may increase the number of available GPRs to 16 registers as discussed above. In other embodiments, increases to other than 16 registers are possible and are contemplated as well. The X field 426 may comprise 1 bit and when set it may extend a value stored in the SIB field 316 that specifies, in one embodiment, a GPR to be used as a source operand. Similarly, the B field 428 may comprise 1 bit and when set it may extend a value stored in either the ModRM field 314, the SIB field 316, or the opcode field 410.

Figure 5:
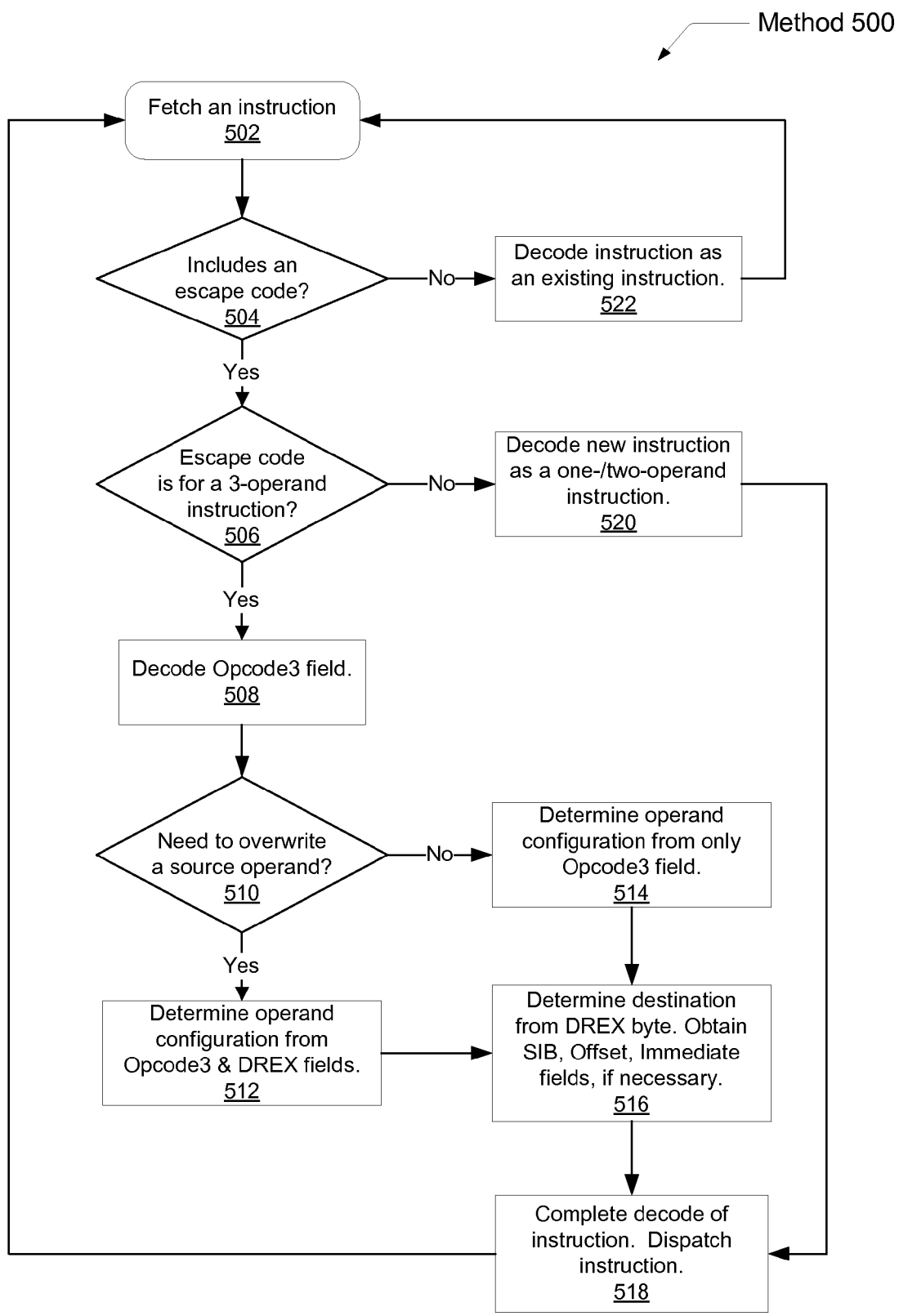
FIG. 5 is a flow diagram of one embodiment of a method for decoding new instructions with an extra operand.

FIG. 5 illustrates one embodiment of a method 500 for decoding new instructions with an extra operand. For purposes of discussion, the steps in this embodiment are shown in sequential order. However, some steps may occur in a different order than shown, some steps may be performed concurrently, some steps may be combined with other steps, and some steps may be absent in another embodiment. A processor may be executing instructions of a software application. An instruction may be fetched in block 502 alone or in combination with other instructions in a memory line. If the instruction does not include an escape code (decision block 504), then the instruction is decoded as an existing instruction in block 522. If an escape code is included in the instruction, but the escape code is not for a 3-operand instruction (decision block 506), then the instruction is decoded as a new instruction with a one- or two-operand format in block 520.

An instruction with a 3-operand escape code has its Opcode3 field decoded in block 508. From the combination of the escape code and Opcode3 fields, if it is found the operation will use the destination field as one of the source operands (decision block 510), then the operand configuration, size, and format are determined from the combination of the Opcode3 and DREX fields in block 512. Otherwise, the destination field is not to be used as a source operand and the operand configuration, size, and format are determined only from the Opcode3 field in block 514.

Next the location of the actual destination field and source operands are determined in block 516. The DREX field is used to determine the destination of the result of the operation. The ModRM field is used to determine all or some of the source operands. The SIB, Offset, and Immediate fields in the instruction may or may not be used to determine the location of the source operands depending on the instruction itself and the required addressing format. Finally, in block 518, the instruction is completely decoded with control and data signals ready to be stored in a buffer. The contents of the buffer may later be dispatched to a scheduler within the processor.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
an instruction fetch unit configured to fetch instructions from a memory;
a decoder coupled to the instruction fetch unit; and
an execution unit coupled to the decoder;
wherein the decoder is configured to:
receive an instruction comprising at least an escape code field and an opcode field;
determine via the escape code field that said instruction comprises three operand identifiers which identify three operands of the instruction, wherein said three operands include a destination operand, and wherein said operand identifiers identify a destination location of the destination operand; and
determine via the escape code field that the destination location is used for both the destination operand and a source operand;
wherein the execution unit is configured to execute said instruction, wherein said executing comprises utilizing the three operands.

2. The processor as recited in claim 1, wherein said instruction includes a ModRM field and a destination register extension (DREX) field, and wherein said three operands include a first source operand and a second source operand, and wherein said operand identifiers identify locations of each of the first source operand and the second source operand, wherein said locations are identified by a combination of a portion of the ModRM field and a first portion of the DREX field.

3. The processor as recited in claim 2, wherein said destination location is identified by a second portion of the DREX field.

4. The processor as recited in claim 3, wherein a combination of a portion of the opcode field and a third portion of the DREX determine an order of the source operands.

5. The processor as recited in claim 1, wherein said processor is based on an x86 architecture.

6. The processor as recited in claim 5, wherein said operand identifiers identify general-purpose floating-point single-instruction-multiple-data (SIMD) multimedia registers.

7. The processor as recited in claim 4, wherein said instruction further includes a SIB field, an offset field, and an immediate field.

8. A method of processing a microprocessor instruction identifying at least three operands, wherein the method comprises:
receiving the microprocessor instruction comprising at least an escape code field and an opcode field;
determining via the escape code field that said instruction comprises three operand identifiers which identify three operands of the instruction, wherein said three operands include a destination operand, and wherein said operands identify a destination location of the destination operand;
determining via the escape code field that the destination location is used for both the destination operand and a source operand; and
executing said instruction in a microprocessor, wherein said executing comprises utilizing the three operands.

9. The method as recited in claim 8, wherein said instruction includes a ModRM field and a destination register extension (DREX) field, and wherein said three operands include a first source operand and a second source operand, and wherein said operand identifiers identify locations of each of the first source operand and the second source operand, wherein said locations are identified by a combination of a portion of the ModRM field and a first portion of the DREX field.

10. The method as recited in claim 9, wherein said destination location is identified by a second portion of the DREX field.

11. The method as recited in claim 10 further comprising a combination of a portion of the opcode field and a third portion of the DREX field determines an order of the source operands.

12. The method as recited in claim 8 further comprising executing said instruction in a processor based on an x86 architecture.

13. The method as recited in claim 12 further comprising executing said instruction, wherein said operand identifiers identify general-purpose floating-point single-instruction-multiple-data (SIMD) multimedia registers.

14. The method as recited in claim 11, wherein said instruction further includes a SIB field, an offset field, and an immediate field.

15. A computer readable storage medium comprising software instructions executable by a microprocessor, wherein the microprocessor executes the instructions by a method, and wherein the method comprises:
receiving the microprocessor instruction comprising at least an escape code field and an opcode field;
determining via the escape code field that said instruction comprises three operand identifiers which identify three operands of the instruction, wherein said three operands include a destination operand, and wherein said operands identify a destination location of the destination operand;
determining via the escape code field that the destination location is used for both the destination operand and a source operand; and
executing said instruction, wherein said executing comprises utilizing the three operands.

16. The digital storage medium of claim 15, wherein said instruction includes a ModRM field and a destination register extension (DREX) field, and wherein said three operands include a first source operand and a second source operand, and wherein said operands identify:
locations of each of the first source operand and the second source operand, wherein said locations are identified by a combination of a portion of the ModRM field and a first portion of the DREX field; and
wherein said destination location is identified by a second portion of the DREX field.

17. The digital storage medium of claim 16, wherein said operand identifiers identify general-purpose floating-point single-instruction-multiple-data (SIMD) multimedia registers within an x86 architecture.

* * * * *